United States Patent [19]

Zimmerer et al.

[11] 4,138,812
[45] Feb. 13, 1979

[54] VIBRATION ISOLATION SYSTEM FOR CHAIN SAW STRUCTURES

[75] Inventors: John L. Zimmerer, Torrance; John H. Brooks, Encino, both of Calif.

[73] Assignee: McCulloch Corporation, Los Angeles, Calif.

[21] Appl. No.: 842,061

[22] Filed: Oct. 14, 1977

[51] Int. Cl.² .............................................. B27B 17/02
[52] U.S. Cl. ....................................................... 30/381
[58] Field of Search ................ 30/381, 382, 383, 384, 30/385, 386; 425/817 R

[56] References Cited

U.S. PATENT DOCUMENTS

| | | | |
|---|---|---|---|
| 3,409,056 | 11/1968 | Rauh | 30/381 |
| 3,651,839 | 3/1972 | Stihl | 30/381 |
| 3,889,763 | 6/1975 | Dillon | 30/381 |
| 3,925,526 | 12/1975 | Haas | 425/817 R |
| 3,945,119 | 3/1976 | Nagashima | 30/383 |

*Primary Examiner*—Jimmy C. Peters
*Attorney, Agent, or Firm*—Kenway & Jenney

[57] ABSTRACT

A vibration isolating system for chain saw structures characterized by a handle assembly connected to one side of a vibration generating assembly of a chain saw by a pair of resilient suspension means, with cross-over linkage means being operable to transmit force from the handle assembly to the other side of the vibration generating assembly, across the top of the engine means of this assembly.

A chain saw handle structure of structural foam, connected to a chain saw by resilient, vibration isolating assemblies.

10 Claims, 7 Drawing Figures

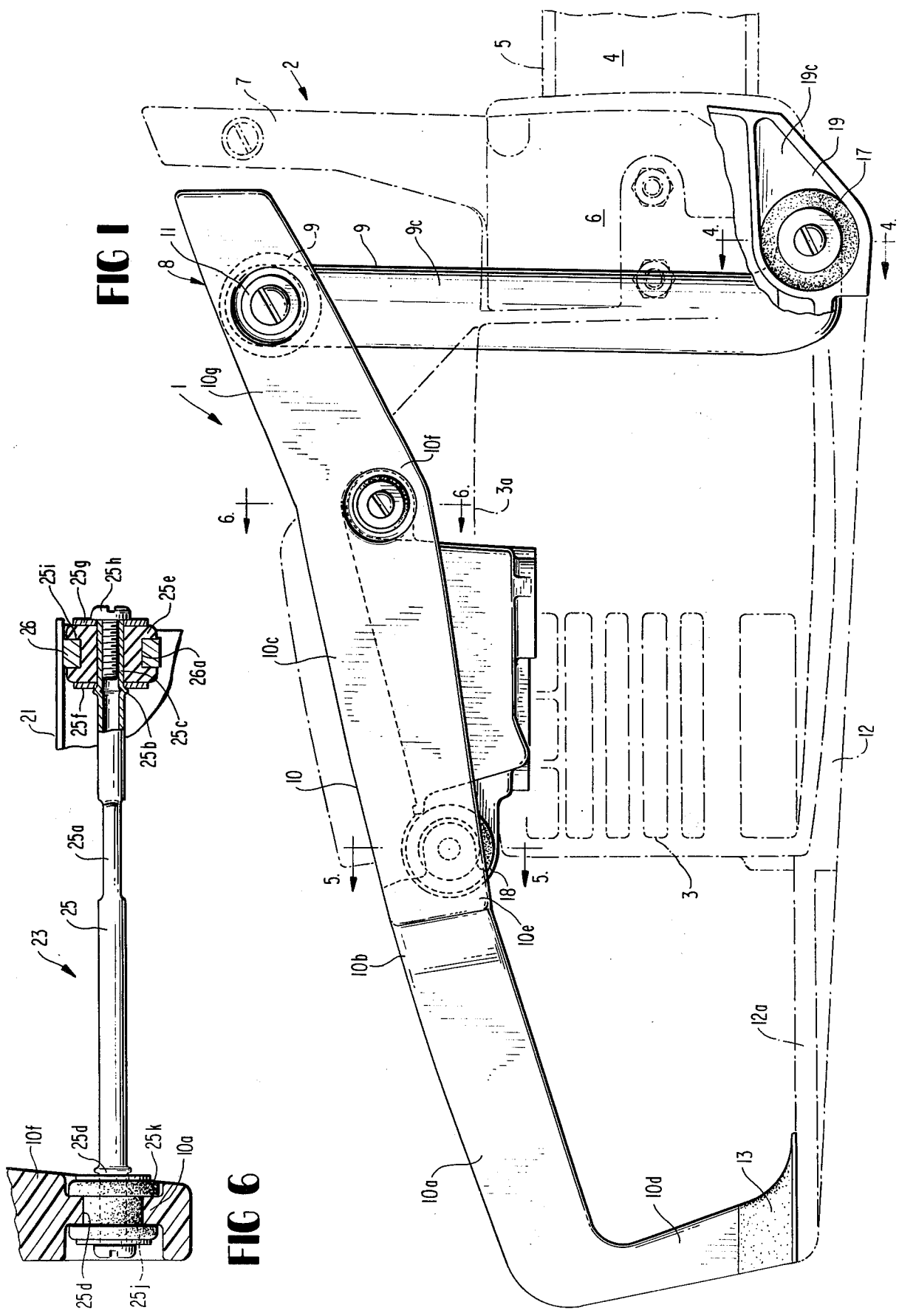

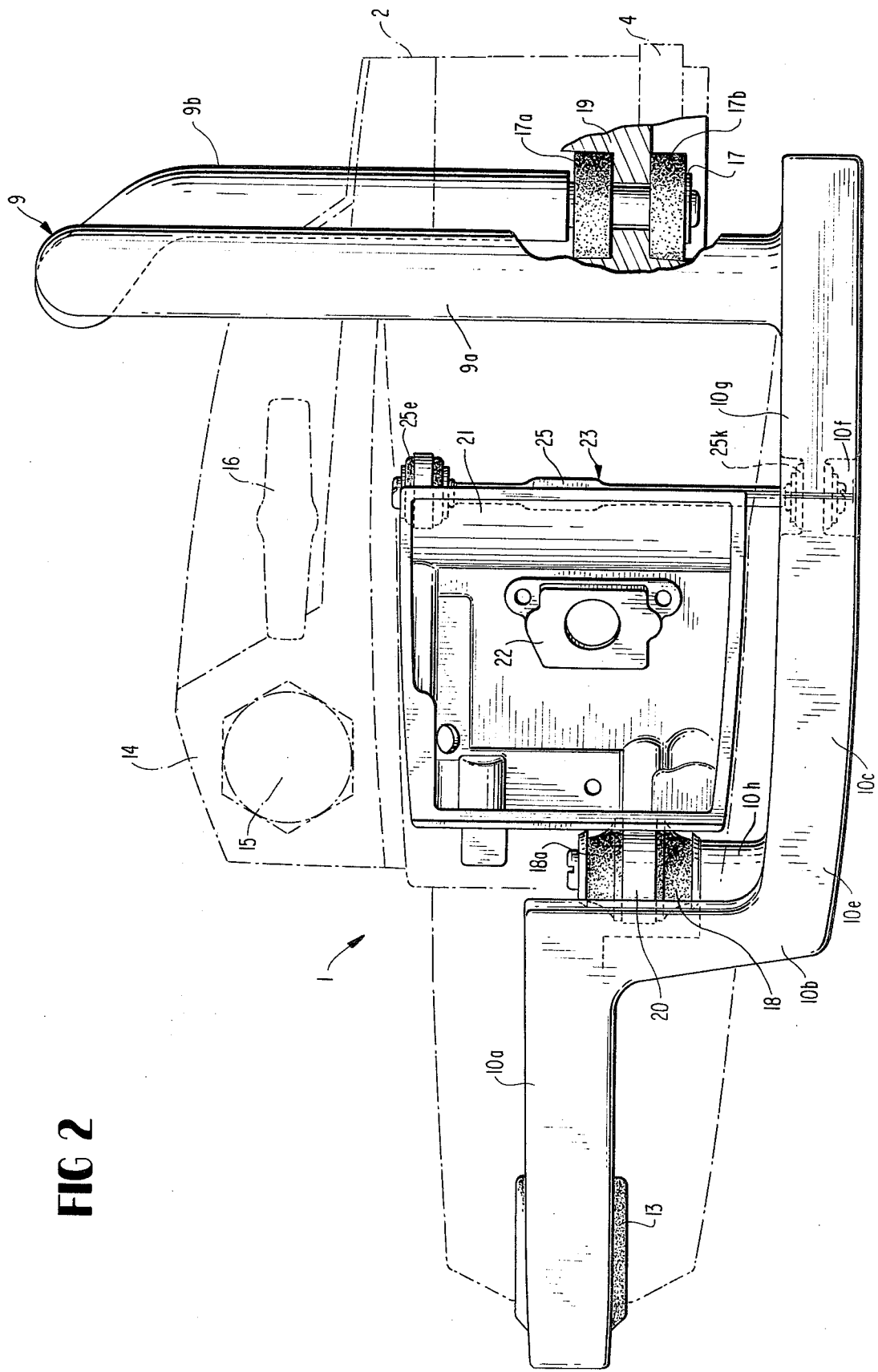

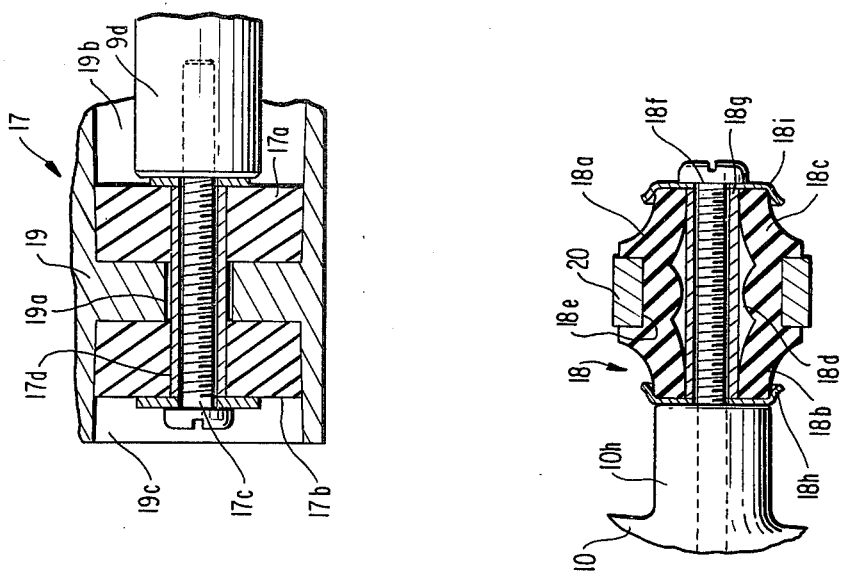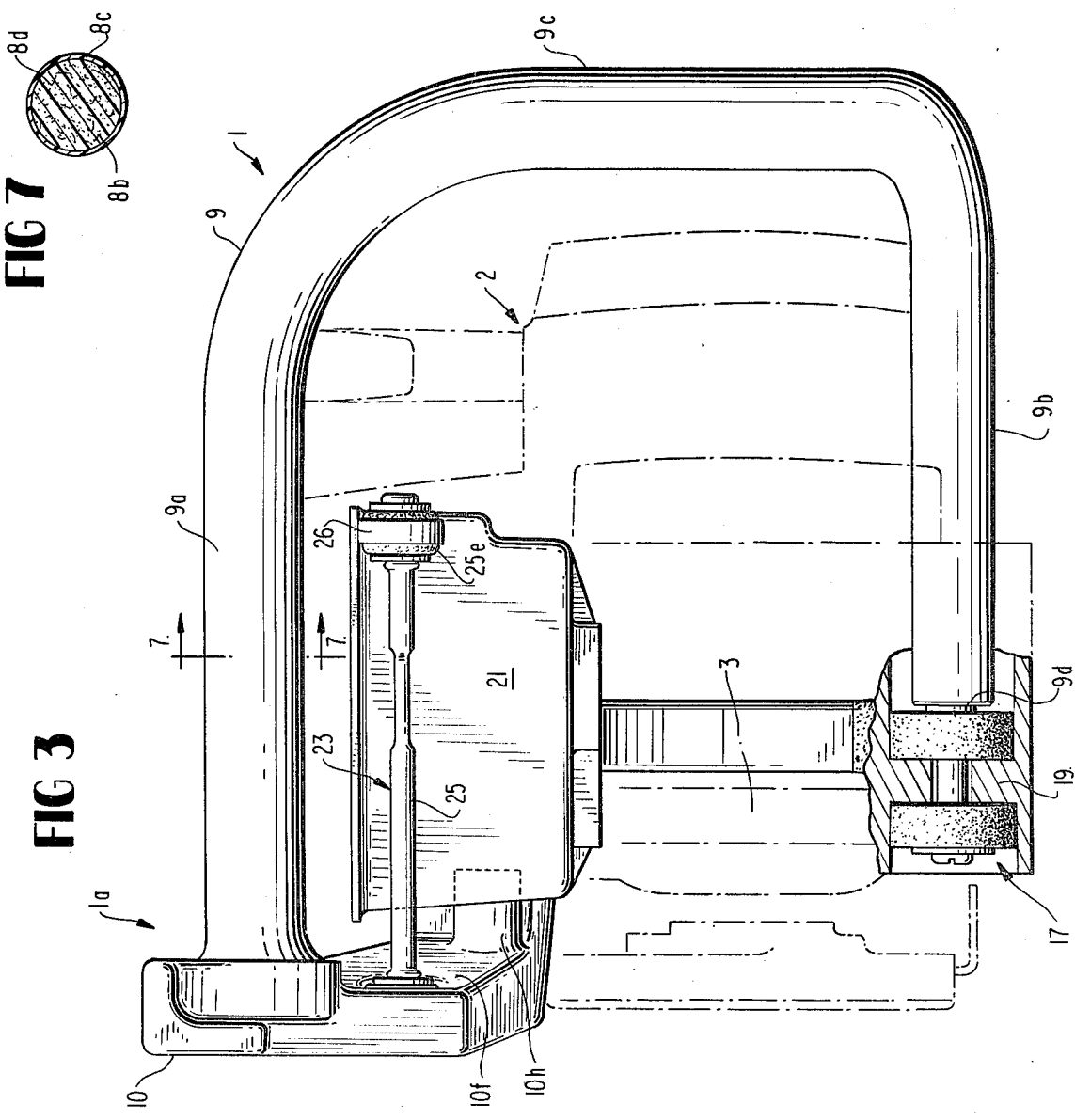

VIBRATION ISOLATION SYSTEM FOR CHAIN SAW STRUCTURES

GENERAL BACKGROUND AND SUMMARY OF INVENTION

In consideration of the maintenance of the health and well-being of chain saw operators, and in an effort to reduce chain saw operator fatigue levels, substantial efforts have been made in the chain saw art to develop vibration isolation systems.

In recent years, substantial advances in the art have been made in relation to a variety of vibration isolation systems.

For example, a number of uniquely effective vibration isolation systems have been developed by the assignee of the present invention, as evidenced by the following U.S. Patents:

Frederickson et al. No. 3,542,095 (Nov. 24, 1970)
Frederickson et al. No. 3,652,074 (Mar. 28, 1972)
Frederickson et al. No. 3,698,455 (Oct. 17, 1972)
Frederickson et al. No. 3,813,776 (June 4, 1974)
Bailey No. 3,845,557 (Nov. 5, 1974)
Bailey No. 3,911,580 (Oct. 14, 1975)
Bailey No. 3,972,119 (Aug. 3, 1976)
Thompson No. 4,041,606 (Aug. 16, 1977)

Other activity in the chain saw vibration isolation art is evidenced by the following U.S. Patents:

La Force No. 3,140,746 (July 14, 1964)
Dobbertin et al. No. 3,224,473 (Dec. 21, 1965)
Irgens No. 3,372,718 (Mar. 12, 1968)
Rauh No. 3,409,056 (Nov. 5, 1968)
Kobayashi No. 3,525,373 (Aug. 25, 1970)
Scharpf No. 3,530,909 (Sept. 29, 1970)
Sherwood, Jr. et al. No. 3,637,029 (Jan. 25, 1972)
Stihl et al. No. 3,651,839 (Mar. 18, 1972)
Emmerich et al. No. 3,680,608 (Aug. 1, 1972)
Kobayashi et al. No. 3,700,015 (Oct. 24, 1972)
Makinson et al. No. 3,728,793 (Apr. 24, 1973)
Notaras et al. No. 3,733,700 (May 22, 1973)
Heermann No. 3,772,784 (Nov. 20, 1973)
Schulin No. 3,845,827 (Nov. 5, 1974)
Kolorz No. 3,849,883 (Nov. 26, 1974)
Dillon No. 3,889,763 (June 17, 1975)
Nagashima et al. No. 3,945,119 (Mar. 23, 1976)

The foregoing tabulations are presented by way of example and are not intended to constitute a complete compilation of all prior art disclosures dealing with vibration isolation systems. Nevertheless, it is believed that the tabulated patents do reasonably adequately depict the overall state of the art and the continuing efforts to develop improved and more effective vibration isolation systems for chain saw structures.

In furthering and advancing the chain saw vibration isolation art, the present applicants have developed a chain saw vibration isolation system which has been found to produce vibration acceleration rates as low as 2G in magnitude. Those skilled in this art will recognize the efficacy and uniqueness of such a low vibration acceleration rate in the context of a chain saw structure.

In accomplishing what is believed to be a significant advance in the chain saw vibration isolation art, through the present invention, a variety of individually significant aspects of the invention are herein presented.

In now summarizing these independently significant aspects of the invention, it will be recognized that these aspects should be considered to be significant in their own independent right, and particularly significant in a combination context.

Independently significant facets of the invention are presented as follows:

One such individually significant aspect of the invention pertains to a chain saw comprising
 a vibration generating assembly including
  engine means,
  guide bar means extending generally longitudinally from one side portion of the chain saw,
  cutter chain means mounted on the periphery of the guide bar means for movement thereabout, and
  drive means operable to drivingly couple the engine means to the cutter chain means;
 a handle assembly including
  a front handle, and
  a rear handle; and
 vibration isolating means interconnecting the handle means and the vibration generating assembly.

In this context, the improvement afforded through this independently significant aspect of the invention resides in vibration isolating means comprising:
 first and second vibration isolating assemblies mutually spaced longitudinally of the chain saw and cooperating with the handle assembly to define a resilient suspension for the vibration generating assembly, disposed generally on the aforesaid one side portion of the chain saw; and
 force transmitting, cross-over linkage means connected with the resilient suspension and operable to transmit forces acting on the resilient suspension generally transversely of a longitudinal median plane of the chain saw, passing generally through the center of gravity thereof, to an opposite side portion of the chain saw.

The aforesaid force transmitting, cross-over linkage means extends generally across the top of the engine means when the chain saw is in an upright cutting position.

Further, this force transmitting, cross-over linkage means is disposed generally longitudinally between planes which extend transversely of the aforesaid longitudinal median plane and are generally aligned with the first and second vibration isolating assemblies.

In addition, the force transmitting, cross-over linkage means cooperates with an upper portion of the front handle means and a side portion of the rear handle means to define a generally U-shaped, at least partially flexible, force transmitting, cantilever connection between the hand of a chain saw operator, engaged with the front handle, and an upper portion of the engine means when the chain saw is in the upright cutting position.

Another independently significant aspect of the invention involves a chain saw handle means comprising:
 a structural foam handle including
 a rigid, closed cell, cellular resin core,
 fibrous elements reinforcing the resin core, and
 a solid resin skin substantially surrounding the cellular resin core.

This structural foam handle is energy absorbing and resilient, shock absorbing coupling means are operable to connect the structural foam handle with a chain saw.

In addition to the aforegoing independently significant aspects of the invention, it is believed that the significance of the invention extends to additional features which are employed individually or in combination in the context of either or both of the foregoing individual invention aspects.

Such combination features of the invention are as follows.

One such combination feature involves a chain saw as heretofore described wherein:

the front handle and rear handle define an interconnected handle assembly comprising structural foam handle means including generally rigid, closed cell, cellular resin core means, fibrous elements reinforcing the cellular resin core means, and solid resin skin means substantially surrounding the cellular resin core means.

In this combination feature, the structural foam handle means is energy absorbing and is resiliently interconnected with the vibration generating assembly through resilient shock absorbing coupling means comprising the aforesaid first and second vibration isolating assemblies.

Another such combination feature involves a chain saw as heretofore described wherein:

the first and second vibration isolating assemblies are generally aligned with a longitudinal plane generally coincident with the guide bar means;

the chain saw includes base plate means underlying the engine means and spaced beneath the rear handle when the chain saw is in the upright cutting position; and the rear handle is disconnected from the base plate.

A third combination feature, in the setting of a chain saw as earlier noted, involves an arrangement wherein the force transmitting, cross-over linkage means includes a relatively rigid, force-transmitting tubular member, first, resilient, vibration absorbing, grommet means interconnecting one end of the tubular member with the aforesaid side portion of the rear handle means, and second resilient, shock absorbing grommet means interconnecting another end of the tubular member with the vibration generating assembly.

In addition, another combination feature relates to a chain saw as noted earlier and the force transmitting, cross-over linkage means described immediately above wherein:

the vibration generating assembly includes a carburator receiving, air box mounted on the engine means, and web means connected with the air box, spaced from the engine means, and supporting the second, resilient, shock absorbing grommet means.

Finally, this invention further contemplates a fifth combination feature, included with the chain saw described earlier wherein:

the first vibration isolating assembly includes a resilient, elastomeric shock absorbing connection between a lower portion of the front handle and a portion of the vibration generating assembly connected with a lower portion of the engine means;

This particular first vibration isolating assembly may include:

apertured web means connected with the engine means, and resilient, elastomeric disk means, carried on shaft means projecting from an end of the aforesaid lower portion of the front handle, and sandwiched on opposite sides of this web means.

This shaft means passes through an aperture of the above noted web means, and is operable to abuttingly engage this web means and provide a solid, force transmitting connection between the front handle and the vibration generating assembly.

In addition, in this fourth combination feature of the invention, the second vibration isolating assembly includes:

a resilient, elastomeric cylinder means, an apertured web means carried by the vibration generating assembly mounted above the engine means and telescopingly receiving the cylinder means, an arrangement wherein the cylinder means is mounted on shaft means projecting from the above noted side portion of the rear handle, and cup means engaging opposite end of the resilient elastomeric cylinder means and axially compressing this resilient, elastomeric cylinder means.

As earlier noted, the combination features above noted may be employed individually in the context of the chain saw and/or handle means noted at the outset of this summary of the invention discussion or may be employed in association with each other in this same context.

Having described and summarized basic aspects of the invention, it now becomes appropriate to give consideration to a particular, presently preferred embodiment which is illustrated in the accompanying drawings.

DRAWINGS

By way of example, but not by way of limitation, the appended drawings depict a presently preferred embodiment of the invention as follows:

FIG. 1 provides a side elevational view of a chain saw of the present invention, depicting a vibration absorbing assembly in solid line, with the chain saw vibration generating assembly being depicted in phantom line so as to permit appropriate focus on major aspects of the present invention;

FIG. 2, continuing the presentation format of FIG. 1, provides a top plan view of the FIG. 2 assembly, depicting, in solid lines, the manner in which the vibration isolating assembly is connected with the base of the vibration generator means of the chain saw and a carburator air box mounted on top of the chain saw engine;

FIG. 3 provides a front elevational view of the FIG. 2 assembly, viewing this assembly from the guide bar end of the chain saw;

FIG. 4 provides an enlarged, transverse, fragmentary sectional view of a shock absorbing connection between the front handle of the chain saw under consideration and a lower web means portion of this assembly, as viewed along section line 4—4 of FIG. 1;

FIG. 5 provides a transverse, sectional, fragmentary view of the interconnection between a side portion of the rear handle of the chain saw under consideration and a web means connected with the aforesaid carburator air box, as viewed generally along section line 5—5 of FIG. 1;

FIG. 6 provides a transverse sectional view of a cross-over linkage means extending between a side portion of the chain saw rear handle and a web means carried by the front of the above noted carburator air box, as viewed generally along section line 6—6 of FIG. 1;

FIG. 7 provides a transverse sectional view of the structural foam constiuent employed in the interconnected front and rear handle of the chain saw under consideration.

Having described the basic disclosure aspects of the appended drawings, it is now appropriate to give consideration to detailed aspects of the preferred embodiment, with reference to these illustrations.

DETAILED DESCRIPTION OF PREFERRED EMBODIMENT

In discussing the preferred embodiment, reference will first be made to the basic chain saw setting of the invention, following which overall aspects of the vibration isolating means and structural foam handle means will be discussed. Thereafter, structural detail of front and rear vibration isolating assemblies will be considered and, in conclusion, structural details of the cross-over linkage means will be discussed.

Context of Invention

As depicted in FIGS. 1, 2 and 3, chain saw 1 comprises a vibration generating assembly 2 which includes an engine assembly 3 and guide bar 4, extending generally longitudinally of the right side portion 1a of the chain saw as depicted in FIG. 2. A schematically illustrated cutter chain 5 is mounted on the peripheral edge of the guide bar 4 for cutting movement about the periphery of the guide bar 4.

A locationally illustrated drive means 6 (usually of the centrifugal clutch type) is provided to drivingly couple the engine means 3 with the cutter chain 5.

Chain saw 1 may include a safety brake actuating handle means 7, as schematically illustrated in FIG. 1 in front of a main handle assembly 8.

Handle assembly 8 may include a generally U-shaped front handle 9 comprising a generally horizontally extending top leg portion 9a extending across the top of the chain saw, a lower generally horizontally extending leg 9b extending across the under side of the chain saw, and an upright leg 9c interconnecting upper and lower leg portions 9a and 9b.

Handle assembly 8 may further include a rear handle 10 as depicted most clearly in FIGS. 1 and 2.

Rear handle 10 includes a hand-grip portion 10a which extends upwardly to a transversely, generally horizontally entending "dog-leg" portion 10b. "Dog-leg" portion 10b is connected with a side portion 10c of rear handle 10. Side portion 10c may be inclinded upwardly along the side 1a of the chain saw and be connected near its upper terminis via threaded connecting means 11 (FIG. 1) with the front handle 9.

Chain saw 1 may further include, as schematically shown, a base plate 12 underlying the overall chain saw and the engine means 3. Plate 12 is spaced from and extends beneath the hand grip portion 10a.

Although not illustrated, hand grip portion 10a would conventionally carry starting and control features such as the throttle trigger, etc. and base plate 12 would provide a rear portion 12a underlying hand grip portion 10a and providing a hand grip shield and a foot engageable base to facilitate chain saw starting operation.

The lower portion of generally L-shaped handle portion 10a, ie. generally upright portion 10d, may extend down to a rubber junction terminis 13 which is carried by handle portion 10d but which is substantially disconnected from base plate 12a so as to maintain rear handle 10 and base 12 substantially disconnected from each other.

As shown in phantom line in FIG. 2, chain saw 1 may include a gas tank 14 with an associated gas filling cap 15 and may further include a "pull-type" starter cord means terminating in a pull handle 16 on the top of the chain saw.

With the basic context of the invention having been set forth, discussion is now in order in relation to the improved combination vibration isolating means of the invention.

The Improved Vibration Isolating Means Of The Basic Invention

As shown in FIGS. 1, 2 and 3, the improved vibration isolating means of the present invention include a first vibration isolating assembly 17 and second vibration isolating assembly 18.

Vibration isolating assembly 17 interconnects an end 9d of lower front handle portion 9b with a web means 19 carried by the lower front end of the vibration generating assembly 2.

The second vibration isolating assembly 18 interconnects a rear portion 10e of rear handle side portion 10c with a web means 20 carried by a carburator air box 21 which is fixably mounted on the top of the engine means 3.

As shown in FIG. 2, carburator air box 21 includes a mounting pad 22 operable to receive an engine carburator (not shown). The carburator air box 21 would be covered by a filter plate and lie beneath the top housing wall of the chain saw.

The first and second vibration isolation assembly 17 and 18 are mutually spaced longitudinally of the chain saw 1 and cooperate with the handle assembly 8 to define a resilient suspension system for the vibration generating assembly 2, disposed generally on the side portion 1a of the chain saw 1.

A particularly significant aspect of this basic vibration isolating concept resides in a force transmitting, cross-over, linkage means 23. Linkage means 23 is connected with the resilient suspension means 24, defined by handle assembly 8 and the first and second vibration isolating assembly 17 and 18.

Cross-over linkage means 23 may include a strut-like linkage 25 connected with the suspension assembly 24 at a forward area 10f of rear handle side portion 10c. Strut member 25 extends generally transversely across an upright longitudinal median plane passing through the center of gravity of the chain saw 1 to a connecting point 26 on the opposite side 1b of chain saw 1 so as to be operable to transmit forces acting on the resilient suspension 24, across the longitudinal median plane of the chain saw (i.e. an upright plane passing longitudinally of the chain saw through the chain saw center of gravity) from one side 1a of the chain saw to the other side 1b of the chain saw. This arrangement tends to provide a general balancing of suspension and vibration isolating forces.

As will be apparent with reference to FIGS. 1 and 3, the force transmitting linkage means 23 extends generally across the top 3a of the engine means 3 when the chain saw is in the illustrated, upright cutting position.

In addition, this force transmitting, cross-over linkage means 23 is disposed generally longitudinally between planes which extend transversely of the longitudinal median plane of chain saw 1 and are generally aligned with the first and second vibration isolating assemblies. Such transverse planes would be generally aligned with the section planes defined by section lines 4—4 and 5—5 in connection with the presentation of the sectional views of FIGS. 4 and 5 respectively.

In addition, the cross-over linkage means 23 cooperates with the upper portion 9a of the front handle 9 and a forward segment 10g of the upper portion 10c of rear handle 10 to define a generally U-shaped, at least partially flexible, force transmitting, cantilever connection between the hand of the chain saw operator engaged with front handle portion 9a and the upper portion 3a of the engine means 3 when the chain saw is in the illustrated, upright cutting position. The at least partially flexible nature of this connection may be provided by the material of strut 25 or may be provided by flexible connecting means at junctures 10f and 26.

An independently significant aspect of the vibration isolating improvement of the present invention-as earlier noted-resides in the structural foam characteristic of handle assembly 8.

Each of the interconnected front and rear handle 9 and 10 are fabricated from structural foam such as foamed nylon. Structural foam is a presently well known construction product and, as schematically illustrated in FIG. 7, provides a handle structure including a generally rigid, closed cell, cellular resin core 8a. Dispersed fibrous elements such as fiber glass 8b may be provided to reinforce the cellular resin core 8a. In the normal manner involved in connection with structural foam structures, a solid resin skin 8c substantially surrounds the cellular resin core (except of course when the ends of members 9 and 10 might terminate by cutting or where the handle members are intersected by apertures, etc.)

The structural foam handle means 8 is energy absorbing, as is recognized as a consequence of structural foam structures, with the resilient shock absorbing coupling means 17 and 18 being operable to connect the structural foam handle means 8 with the chain saw 1.

Having described overall basic aspects of the vibration isolating assembly, it now becomes appropriate to consider structural details of features such as the front vibration isolating assembly 17, the rear vibration isolating assembly 18, and the intermediate, cross-over connecting means 23.

Front And Rear Vibration Isolating Assemblies

The vibration isolation assemblies 17 and 18 are depicted in FIGS. 1, 2, 3, 4 and 5.

FIG. 4 provides a detailed, sectional view of the interconnection between the front, vibration isolation assembly 17 and a web portion 19 carried by the lower front portion of the chain saw vibration generating assembly 2.

FIG. 5, in turn, provides a transverse, sectional, detailed view of the interconnection between the rear, vibration isolation assembly 18 and a web portion 20 which is connected with, and carried by, the vibration generating assembly 2 by way of the carburator air box 21 which is connected with the engine 3.

The first or front vibration isolating assembly 17 comprises a resilient, elastomeric, shock absorbing connection between a lower portion 9b of the front handle 9 and a web portion 19 of the vibration generating assembly 2. Web portion 19 is connected with a lower portion of the engine 3 (lower in the sense that the saw is illustrated, and is now being discussed, with respect to an upright condition).

The first vibration isolation assembly 17, as shown in FIG. 4, includes the apertured web means 18 which is connected with the engine means 3 through suitable housing means, etc. Web means 9 includes a central aperture 19a, extending transversely of the longitudinal median plane of the chain saw.

A pair of resilient elastomeric disks 17a and 17b are carried on a threaded shaft 17c projecting from the end 9d of the lower portion 9b of the front handle 9. As shown, disks members 17a and 17b are centrally apertured and disposed in a "sandwiched" fashion on opposite sides of the web means 19.

In this connection, it will be noted that the resilient disks 17a and 17b are generally circular in configuration and are generally snugly received within recesses 19b and 19c, respectively, on opposite sides of the web means 19. In order to "soften" the shock absorbing action of the disks 17a and 17b which act in radial, axial and torsional directions), these disks could be provided with apertures extending, for example, parallel to the axis of the disk apertures.

As shown in FIG. 4, a spacing sleeve 17b maybe mounted on the threaded shaft 17c so as to prevent over compression of the resilient disks 17a and 17b when these disks are drawn snugly into engagement with opposite sides of the web 19. This "sandwiching" is achieved through the action of screwing the threaded shaft 17c into the end 9d of the lower handle portion 9b, with the components of unit 17 assembled as shown.

As shown in FIG. 4, web aperture 19a has an internal diameter somewhat larger than the external diameter of the shaft means sleeve 17d so, in essence, as to provide a radial clearance between the shaft means 17c-17d and the web means 19 and accomodate shock absorbing movement of the shaft means. However, under conditions of unusually heavy applications of loads between the handle 9 and the guide bar 4, the exterior portion 17d of the shaft means is operable to abbutingly engage the wall means of the aperture 19a of web 19 so as to provide a solid, force transmitting connection between the front handle 9 and the vibration generating assembly 2.

Turning now to the second or rear vibration isolation assembly 18, which is depicted in section in FIG. 5, it will be noted that this structure is characterized by a continuously resilient connection between the rear handle 10 and the vibration generating assembly 2 (through the interconnected web means 20, carburator air box 21, and engine 3).

As shown in FIG. 5, the second vibration isolating assembly 18 comprises a resilient, elastomeric cylinder means 18a having concave, generally arcuate end portions 18b and 18c lying on opposite sides of an internally bulged "bumper" portion 18d.

Cylinder means 18a is mounted on the web means 20 by being telescoped through an apertured portion 20a of the web means 20, with a generally annular seat 18e of cylinder 18 being socketed within the aperture 20a so as to embrace the web means 20 in socketed engagement.

Web 20 means 20, as earlier noted, is carried by the vibration generating assembly 2 and mounted above the engine means 3. This web means 20 functions to telescopingly receive the cylinder means 18, which provides axial, radial and torsional shock absorbing action.

Cylinder means 18a is connected with handle portion 10 by way of a threaded shaft 18f and spacer sleeve 18g, telescopingly mounted on the shaft 18f. Shaft 18f threadably engages a handle mounting stud 10h which is carried by the handle side portion 10c and projects from the handle side portion 10c generally toward the mounting web 20, as shown in FIG. 2.

As illustrated in FIG. 5, the cylinder means 18a is mounted telescopingly on the shaft means 18f–18g which projects from the side portion 10c of the rear handle 10.

Metallic, centrally apertured, cup means 18h and 18i engage opposite axially ends of the cylinder means 18a. Through the compressive action of the threaded shaft 18f during its installation, these cups 18h and 18i are brought into axially compressive engagement with opposite ends of the cylinder means 18a so as to enhance the shock absorbing action of the assembly and prolong its operating life.

During operation of the vibration isolation assembly 18, the internal bulge area 18a functions as a "bumper", operable to engage the outer periphery of the sleeve portion 18g of the shaft assembly so as to inhibit excessive axial vibration movements.

Cross-Over Linkage Means

Structural details of the force balancing and distributing, cross-over linkage means 23 are depicted in FIGS. 1, 2, 3, and 6 with FIG. 6 providing a particularly illustrative, cross sectional view.

Cross-over linkage means 23 may include a relatively rigid, force transmitting tubular member 25 operable to transmit forces transversely of the longitudinal median plane of the chain saw.

Tubular member 25 may be provided with a tool engaging, flattened portion 25a as shown in FIG. 6 so as to facilitate immobilizing of member 25 during installation of threaded components, etc. as subsequently described.

Tubular member 25a includes an upset annular ridge 25b at one end 25c adjacent web means 26 and another upset exterior annular ridge 25d adjacent handle mounting portion 10f.

A first, resilient, vibration absorbing grommet 25e is mounted on the end 25c of the tubular member 25 between washers 25f and 25g.

A threaded fastener 25h, threadably engaged with the end 25c of tubular member 25, urges the assembly of washer 25f, grommet 25e, and washer 25g against the annular ridge or shoulder 25b so as to secure these components on the shaft end 25c.

The grommet 25e includes an external annular seat 25i which is disposed in socketed engagement with the apertured web portion 26a, as generally illustrated in FIG. 6.

An arrangement substantially identical to that heretofore described in relation to the grommet 25e is disposed at the other end 25j of the tubular member 25 for the purpose of mounting this end 25j to the handle portion 10f.

As illustrated in FIG. 6, the assembly at the member end 25j comprises an annular grommet 25k which, by virtue of a seat or annular recess 25l, is disposed in socketed engagement within an apertured, annular web 10h carried by the handle mounting area 10f.

Each of the grommets 25e and 25k provide resilient, universally flexible, vibration isolation connections at the ends of the force transmitting linkage means 25 while permitting the transmittal of axial force transversely of the chain saw.

In this connection, it will be noted that the mounting washers associated with each grommet axially overlap the apertured web associated with the grommet between these washers. This insures effective transverse force transmission, without running the risk of grommets being forced out of their mounted condition.

Having now described structural details of the front and rear vibration isolation assemblies as well as structural details of the cross-over linkage means, it is now appropriate to review certain aspects of the invention including major advantages, unobviousness, and over all scope.

SUMMARY OF MAJOR ADVANTAGES, UNOBVIOUSNESS, AND SCOPE OF INVENTION

A most significant advantage of the invention resides in the manner in which vibration accelerations in chain saws are able to be reduced to a level on the order of about 2G.

In addition, the unique utilization of a potentially solid coupling front vibration isolating means 17, in combination with a continuously flexible rear vibration isolating means 18 is believed to provide a uniquely effective control in the general plane of the guide bar, affording an operator a unique ability to apply controllable force to the guide bar so as to effect necessary pressing and lifting operations under extreme conditions.

The stability and load distribution feature provided by the cross-over linkage means is believed to be particularly novel, unique and useful in tending to balance and properly distribute the vibration isolating loads and handling forces. This cross-over linkage means serves to transmit chain saw loads and forces from one side of the chain saw, where the front and rear vibration isolation mounts are located, to the opposite side of the chain saw so as to balance overall handling and loads.

In addition, it should not be overlooked that the unique U-shaped, at least partially flexible interconnection between the front handle and the vibration generating engine 3, as afforded by elements 9a, 10g, and 25, provides a unique, cantilever-type shock absorbing connection between the front handle 9 and the vibration generating engine.

With respect to unobviousness, the patents noted at the outset of this disclosure manifest a variety of directions in the vibration isolating art, none constituting a defined direction leading toward the present invention.

With respect to the unique cross-over linkage means of the invention, constituting a particularly significant facet of the present invention, it is recognized that the prior art disclosure of Sherwood Jr. U.S. Pat. No. 3,637,029, above noted, includes a type of transverse strut 30 (FIG. 2 of Sherwood, Jr. et al disclosure). Nevertheless, this Sherwood et al strut is in no way suggestive of the upper, cross-over linkage means of the present invention which transfers loads and forces across the top of the chain saw and provides, in combination with portions of the front and rear handle means, a unique, cantilevered, partially flexible, force transmitting connection between the hand of a chain saw operator engaged with the front handle means and the vibration generating engine assembly.

With respect to the structural foam characteristics of the present invention, it is to be appreciated that structural foam has been employed in connection with such structures as bicycle handles and it has been heretofore been recognized that structural foam has a potential to absorb energy. All this not withstanding, these prior art recognitions are not deemed to be suggestive of the utilization of a structural foam handle assembly in the context of a vibration generating chain saw, with supplemental, relatively softer, resilient shock absorbing coupling means providing the connection between the structural foam handle means and the vibration isolating assembly.

With respect to the "dog-leg" handle configuration for the rear handle, and the manner in which vibration isolating assemblies are employed between such a dog-leg rear handle and a generally U-shaped front handle, it is recognized that prior art structures such as the Pioneer Model P-28 saw manufactured by Outboard Marine Corporation of Lincoln, Nebr. and the model P-100, P-85 saws manufactured by A. B. Partner of Sweden generally contemplate such arrangements. Nevertheless, these prior art Pioneer and Partner structures are not suggestive of the use of such arrangements with the cross-over linkage concept characterizing a basic aspect of the present invention and are not known to be suggestive of the unique structural foam handle concept presented through this invention.

With respect to alternative modes of practicing this invention, a great variety of alternative structures will be readily envisioned by those skilled in the chain saw vibration isolating art and familiar with the disclosure of the present invention.

For example, under appropriate circumstances, the front mount 17 might be replaced by a structure such as that incorporated in the rear mount 18 and it is also possible, under appropriate circumstances, that the rear mount 18 might be replaced by a mount as generally contemplated in connection with the front mount 17.

In this general sense, a variety of resilient shock absorbing means could be employed in connection with the resilient shock absorbing mounts 17, 18, 25e and 25k and flexible vibration isolating systems other than the specific mount concepts disclosed could well be employed.

In addition, some of the energy absorbing characteristics of the handle assembly 8, in appropriate circumstances, possibly could be achieved through other shock absorbing, handle body structures, keeping in mind proposals of the general nature featured in the earlier tabulated Dillon U.S. Pat. No. 3,889,763 and Kobayshi et al. U.S. Pat. No. 3,700,015.

However, the structural foam handle is believed to be particularly advantageous because it is energy absorbing while retaining the generally rigid characteristics of a steel or other rigid material handle.

It will also be recognized that the vibration isolating characteristics of the structures disclosed may be appropriately altered. For example, as noted, the resilient discks featured in the FIG. 4 mount could be rendered softer by providing laterally extending apertures extending through the disk bodies generally parallel to the central axis of these disks.

Such variations in the practice of the present invention, as well as a wide variety of changes in dimensions, structural configurations, etc. could be employed.

Thus, those skilled in the vibration isolating art and familiar with the present disclosure may well recognize additions, deletions, substitutions, modifications, alterations, and equivalent structures which would fall within the purview of the present invention as set forth in the appended claims.

What is claimed is:

1. In a chain saw comprising
   a vibration generating assembly including
      engine means,
         guide bar means extending generally longitudinally from one side portion of said chain saw,
         cutter chain means mounted on the periphery of said guide bar means for movement thereabout, and,
         drive means operable to drivingly couple said engine means to said cutter chain means;
   a handle assembly including
      a front handle, and
      a rear handle; and
   vibration isolating means interconnecting said handle means and said vibration generating assembly;
the improvement in said vibration isolating means comprising:
   first and second vibration isolating assemblies mutually spaced longitudinally of said chain saw and cooperating with said handle assembly to define a resilient suspension for said vibration generating assembly, disposed generally on said one side portion of said chain saw; and
   force transmitting, cross-over linkage means connected with said resilient suspension and operable to transmit forces acting on said resilient suspension generally transversely of a longitudinal median plane of said chain saw, passing generally through the center of gravity thereof, to an opposite side portion of said chain saw,
      said force transmitting, cross-over linkage means extending generally across the top of said engine means when said chain saw is in an upright cutting position,
      said force transmitting, cross-over linkage means being disposed generally longitudinally between planes which extend transversely of said longitudinal median plane and are generally aligned with said first and second vibration isolating assemblies, and
      said force transmitting, cross-over linkage means cooperating with an upper portion of said front handle means and a side portion of said rear handle means to define a generally U-shaped, at least partially flexible, force transmitting, cantilever connection between the hand of a chain saw operator, engaged with said front handle, and an upper portion of said engine means when said chain saw is in said upright cutting position.

2. A chain saw as described in claim 1 wherein:
   said front handle and rear handles define an interconnected handle assembly comprising structural foam handle means including
      generally rigid, closed cell, cellular resin core means,
      fibrous elements reinforcing said cellular resin core means, and
      solid resin skin means substantially surrounding said cellular resin core means;
   said structural foam handle means being energy absorbing; and
   said structural foam handle means being resiliently interconnected with said vibration generating assembly through resilient shock absorbing coupling means comprising said first and second vibration isolating assemblies.

3. A chain saw as described in claim 1 wherein:
said first and second vibration isolating assemblies are generally aligned with a longitudinal plane generally coincident with said guide bar means; and
said chain saw includes base plate means underlying said engine means and spaced beneath said rear handle when said chain saw is in said upright cutting position;
said rear handle being disconnected from said base plate.

4. A chain saw as described in claim 1 wherein:
said force transmitting, cross-over linkage means includes
a relatively rigid, force-transmitting tubular member,
first, resilient, vibration absorbing grommet means interconnecting one end of said tubular member with said side portion of said rear handle means, and
second, resilient, shock absorbing grommet means interconnecting another end of said tubular member with said vibration generating assembly.

5. A chain saw as described in claim 1 wherein:
said force transmitting, cross-over linkage means includes
a relatively rigid, force-transmitting tubular member,
first, resilient, vibration absorbing grommet means interconnecting one end of said tubular member with said side portion of said rear handle means, and
second, resilient, shock absorbing grommet means interconnecting another end of said tubular member with said vibration generating assembly; and
said vibration generating assembly includes
a carburator receiving, air box mounted on said engine means, and
web means connected with said air box, spaced from said engine means, and supporting said second, resilient, shock absorbing grommet means.

6. A chain saw as described in claim 1 wherein:
said first vibration isolating assembly includes
a resilient, elastomeric shock absorbing connection between a lower portion of said front handle and a portion of said vibration generating assembly connected with a lower portion of said engine means;
said first vibration isolating assembly including
apertured web means connected with said engine means, and
resilient, elastomeric disk means, carried on shaft means projecting from an end of said lower portion of said front handle, and sandwiched on opposite sides of said web means,
said shaft means passing through an aperture of said web means and being operable to abuttingly engage said web means and provide a solid, force transmitting connection between said front handle and said vibration generating assembly;
said second vibration isolating assembly includes
a resilient, elastomeric cylinder means,
an apertured web means carried by said vibration generating assembly, mounted above said engine means and telescopingly receiving said cylinder means,
said cylinder means being mounted on shaft means projecting from said side portion of said rear handle, and
cup means engaging opposite ends of said resilient elastomeric cylinder means and axially compressing said resilient, elastomeric cylinder means.

7. A chain saw as described in claim 1 wherein:
said force transmitting, cross-over linkage means includes
a relatively rigid, force-transmitting tubular member,
first, resilient, vibration absorbing, grommet means interconnecting one end of said tubular member with said side portion of said rear handle means, and
second resilient shock absorbing grommet means interconnecting another end of said tubular member with said vibration generating assembly;
said first vibration isolating assembly includes
a resilient, elastomeric shock absorbing connection between a lower portion of said front handle and a portion of said vibration generating assembly connected with a lower portion of said engine means;
said first vibration isolating assembly including
apertured web means connected with said engine means, and
resilient, elastomeric disk means, carried on shaft means projecting from an end of said lower portion of said front handle, and sandwiched on opposite sides of said web means,
said shaft means passing through an aperture of said web means and being operable to abuttingly engage said web means and provide a solid, force transmitting connection between said front handle and said vibration generating assembly; and
said second vibration isolating assembly includes
a resilient, elastomeric cylinder means,
an apertured web means carried by said vibration generating assembly, mounted above said engine means and telescopingly receiving said cylinder means,
said cylinder means being mounted on shaft means projecting from said side portion of said rear handle, and
cup means engaging opposite ends of said resilient elastomeric cylinder means and axially compressing said resilient, elastomeric cylinder means.

8. A chain saw as described in claim 1 wherein:
said front handle and rear handles define an interconnected handle assembly comprising structural foam handle means including
generally rigid, closed cell, cellular resin core means,
fibrous elements reinforcing said cellular resin core means, and
solid resin skin means substantially surrounding said cellular resin core means;
said structural foam handle means being energy absorbing; and
said structural foam handle means being resiliently interconnected with said vibration generating assembly through resilient shock absorbing coupling means comprising said first and second vibration isolating assemblies;

said first and second vibration isolating assemblies are generally aligned with a longitudinal plane generally coincident with said guide bar means; and said chain saw includes base plate means underlying said engine means and spaced beneath said rear handle when said chain saw is in said upright cutting position;

said rear handle being disconnected from said base plate.

9. A chain saw as described in claim 1 wherein:

said front handle and rear handles define an interconnected handle assembly comprising structural foam handle means including generally rigid, closed cell, cellular resin core means, fibrous elements reinforcing said cellular resin core means, and solid resin skin means substantially surrounding said cellular resin core means;

said structural foam handle means being energy absorbing; and said structural foam handle means being resiliently interconnected with said vibration generating assembly through resilient shock absorbing coupling means comprising said first and second vibration isolating assemblies;

said first and second vibration isolating assemblies are generally aligned with a longitudinal plane generally coincident with said guide bar means;

said chain saw includes base plate means underlying said engine means and spaced beneath said rear handle when said chain saw is in said upright cutting position;

said rear handle being disconnected from said base plate;

said force transmitting, cross-over linkage means includes a relatively rigid, force-transmitting tubular member, first, resilient, vibration absorbing, grommet means interconnecting one end of said tubular member with said side portion of said rear handle means, second resilient shock absorbing grommet means interconnecting another end of said tubular member with said vibration generating assembly;

said first vibration isolating assembly includes a resilient, elastomeric shock absorbing connection between a lower portion of said front handle and a portion of said vibration generating assembly connected with a lower portion of said engine means;

said first vibration isolating assembly including apertured web means connected with said engine means, and resilient, elastomeric disk means, carried on shaft means projecting from an end of said lower portion of said front handle, and sandwiched on opposite sides of said web means, said shaft means passing through an aperture of said web means and being operable to abuttingly engage said web means and provide a solid, force transmitting connection between said front handle and said vibration generating assembly; and said second vibration isolating assembly includes a resilient, elastomeric cylinder means, an apertured web means carried by said vibration generating assembly, mounted above said engine means and telescopingly receiving said cylinder means, said cylinder means being mounted on shaft means projecting from said side portion of said rear handle, and cup means engaging opposite ends of said resilient elastomeric cylinder means and axially compressing said resilient, elastomeric cylinder means.

10. In a chain saw comprising a vibration generating assembly including engine means, guide bar means extending generally longitudinally from one side portion of said chain saw, cutter chain means mounted on the periphery of said guide bar means for movement thereabout, and drive means operable to drivingly couple said engine means to said cutter chain means; and handle means supporting said vibration generating assembly;

the improvement in said handle means comprising:

a shock absorbing, unitized structural foam handle including a rigid, closed cell, cellular resin core, fibrous elements reinforcing said resin core, and a solid resin skin substantially surrounding said cellular resin core;

said structural foam handle being energy absorbing; and resilient, shock absorbing coupling means operable to connect said structural foam handle with said vibration generating assembly;

said resilient, shock absorbing, coupling means comprising first and second vibration isolating assemblies mutually spaced longitudinally of said chain saw and cooperating with said handle means to define a relatively soft, resilient suspension for said vibration generating assembly;

said resilient suspension providing a relatively soft, elastic, vibration isolating means interconnecting said vibration generating assembly and said shock absorbing, structural foam handle, said shock absorbing, structural foam handle comprising unitized handle means providing hand engaging portions at opposite ends of said engine means.

* * * * *